(12) United States Patent
Suzuki et al.

(10) Patent No.: US 8,343,248 B2
(45) Date of Patent: Jan. 1, 2013

(54) FILTER UNIT PANEL

(75) Inventors: Masatoshi Suzuki, Osaka (JP); Youzou Yano, Osaka (JP); Akio Suzuki, Osaka (JP)

(73) Assignee: Nitto Denko Corporation, Osaka (JP)

( * ) Notice: Subject to any disclaimer, the term of this patent is extended or adjusted under 35 U.S.C. 154(b) by 355 days.

(21) Appl. No.: 12/743,079

(22) PCT Filed: Nov. 11, 2008

(86) PCT No.: PCT/JP2008/070522
§ 371 (c)(1),
(2), (4) Date: May 14, 2010

(87) PCT Pub. No.: WO2009/063876
PCT Pub. Date: May 22, 2009

(65) Prior Publication Data
US 2010/0236203 A1    Sep. 23, 2010

(30) Foreign Application Priority Data
Nov. 16, 2007    (JP) .................. 2007-298673

(51) Int. Cl.
*B01D 46/00* (2006.01)
(52) U.S. Cl. ..... 55/483; 55/484; 55/DIG. 3; 55/DIG. 31
(58) Field of Classification Search .................. 55/482, 55/483, 484, DIG. 5, DIG. 31
See application file for complete search history.

(56) References Cited

U.S. PATENT DOCUMENTS

| 6,349,015 | B1 | 2/2002 | Hayashi |
| 7,753,981 | B2 * | 7/2010 | Kawano et al. ................. 55/497 |
| 2008/0105126 | A1 | 5/2008 | Kawano et al. |

FOREIGN PATENT DOCUMENTS

| CN | 1668363 | 9/2005 |
| JP | 55-133217 U | 9/1980 |
| JP | 57-005829 U | 1/1982 |
| JP | 61-195316 U | 12/1986 |
| JP | 63-147628 U | 9/1988 |
| JP | 5-018622 U | 3/1993 |
| JP | 5-026127 U | 4/1993 |

(Continued)

OTHER PUBLICATIONS

International Preliminary Report on Patent ability for PCT/JP2008/070522, issued Jun. 29, 2010.*

*Primary Examiner* — Robert Clemente
(74) *Attorney, Agent, or Firm* — Hamre, Schumann, Mueller & Larson, P.C.

(57) ABSTRACT

The present invention provides a filter unit panel in which the generation of an organic gas derived from an adhesive can be suppressed although a plurality of filter units each having a frame body made of a resin member and an outer frame that surrounds these units are used together. This filter unit panel includes a plurality of filter units (100) and an outer frame (10) that surrounds these units. Each of the plurality of filter units includes a pleated filter medium and a frame body that supports the filter medium. Both of the outer frame (10) and the frame body are resin members. The filter units (100) are integrated into a single unit by welding their frame bodies adjacent to each other, and the outer frame and the frame bodies are integrated with each other by welding.

16 Claims, 8 Drawing Sheets

FOREIGN PATENT DOCUMENTS

| | | |
|---|---|---|
| JP | 8-266842 A | 10/1996 |
| JP | 11-066808 | 3/1999 |
| JP | 2000-283545 A | 10/2000 |
| JP | 2002-239325 A | 8/2002 |
| JP | 2004-290913 A | 10/2004 |
| JP | 2004-351730 | 12/2004 |
| JP | 2005-074292 A | 3/2005 |
| JP | 2005-177641 A | 7/2005 |
| JP | 2008-119683 A | 5/2008 |
| WO | 2004/009216 | 1/2004 |

* cited by examiner

FILTER UNIT PANEL

TECHNICAL FIELD

The present invention relates to filter unit panels used, for example, in air inlets of clean rooms, air conditioning equipment, gas turbines, and steam turbines.

BACKGROUND ART

An air filter is provided in each inlet of, for example, clean rooms, air conditioning equipment, gas turbines, and steam turbines. An air filter suitable for these purposes is a filter unit panel in which a plurality of filter units, each having a filter medium and a frame body for supporting it, are joined together with their outer peripheral surfaces being in contact with each other. JP 2005-177641 A discloses in FIG. 2 an example of a filter unit panel in which filter units, each having a frame body (supporting frame) made of a resin member, are joined together.

A filter unit panel further is provided with an outer frame that surrounds the outer peripheral surface of the panel in some cases. The outer frame protects the filter units, increases the strength of the entire panel, and facilitates installing the filter units. Conventionally, a metal member such as aluminum or a wood member has been used for the outer frame.

DISCLOSURE OF THE INVENTION

In the case where the frame body of each filter unit is made of a resin member, the filter units and the outer frame made of a metal member or a wood member generally are bonded to each other with an adhesive. When the filter units and the outer frame are bonded with an adhesive, an air filter including them may generate an organic gas derived from the adhesive. The generation of such an organic gas from the air filter must be prevented particularly when the air filter is used in a clean room or the like.

It is an object of the present invention to provide a filter unit panel in which the generation of an organic gas can be suppressed although a plurality of filter units each having a frame body made of a resin member and an outer frame that surrounds these filter units are used together.

The present invention provides a filter unit panel including: a plurality of filter units; and an outer frame that surrounds the plurality of filter units. In this filter unit panel, each of the plurality of filter units includes a filter medium and a frame body that supports the filter medium, both of the outer frame and the frame bodies are resin members, the plurality of filter units are integrated into a single unit by welding the adjacent frame bodies, and the outer frame and the frame bodies adjacent to the outer frame are integrated with each other by welding.

In the filter unit panel of the present invention, the outer frame and the frame bodies of the filter units are integrated with each other by welding, and the adjacent frame bodies also are integrated with each other by welding. Therefore, there is no need to use an adhesive to assemble the components, which suppresses the generation of an organic gas.

The present invention also makes it possible to compose the entire filter unit panel of a combustible material because a resin is used instead of a metal as a material of the outer frame. The filter unit panel composed of such a combustible material can be disposed of by incineration easily. In addition, the filter unit panel in which the outer frame and the frame bodies as well as the frame bodies themselves are bonded to each other by welding can be manufactured more efficiently than a panel in which locking hooks are used for joining them.

BEST MODE FOR CARRYING OUT THE INVENTION

Hereinafter, an embodiment of the present invention will be described as an example with reference to the accompanying drawings.

Figure 1:
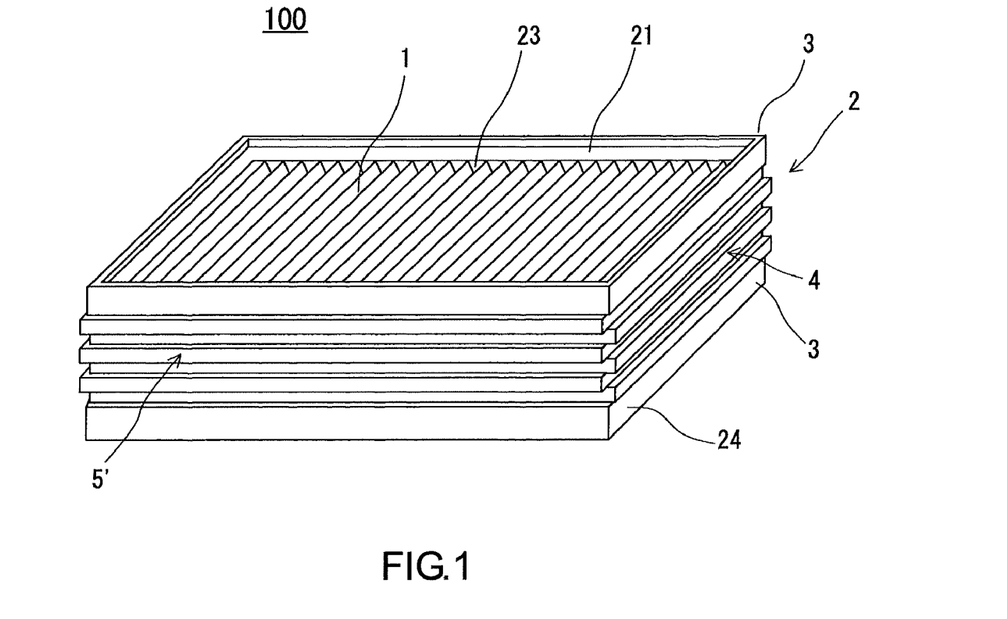
FIG. 1 is a perspective view showing an embodiment of a filter unit.

As shown in FIG. 1, a filter unit 100 includes a filter medium 1 and a frame body 2, and the peripheral portion of the filter medium 1 is supported by the frame body 2. The filter medium 1 is pleated (accordion-folded) to increase the filtration area. The filter medium 1 is rectangular in shape when viewed in plan (along the flow of air passing through the filter medium). The frame body 2 has a shape of a rectangular picture frame having inner and outer peripheries, each of which is rectangular in shape in plan view, and the filter medium 1 is supported by the inner peripheral surface 23 of the frame body 2.

The frame body 2 is suitably a resin member that is formed by injection molding to fix the peripheral portion of the filter medium 1 to the frame body 2, more specifically, to fix the peripheral portion of the filter medium 1 to the frame body 2 with the peripheral portion being embedded in the frame body 2. Injection molding allows the formation of the frame body 2 and the fixing of the filter medium 1 to the frame body 2 to be performed simultaneously, and thereby simplifies the manufacturing processes. The injection-molded resin member is subject to defects such as warpage and shrinkage. Therefore, if the air filter is installed with the injection-molded resin member being located at the outermost of the air filter, the air filter may be sealed incompletely. The outer frame described below, however, can prevent the occurrence of the defects of the injection-molded frame body.

Figure 2:
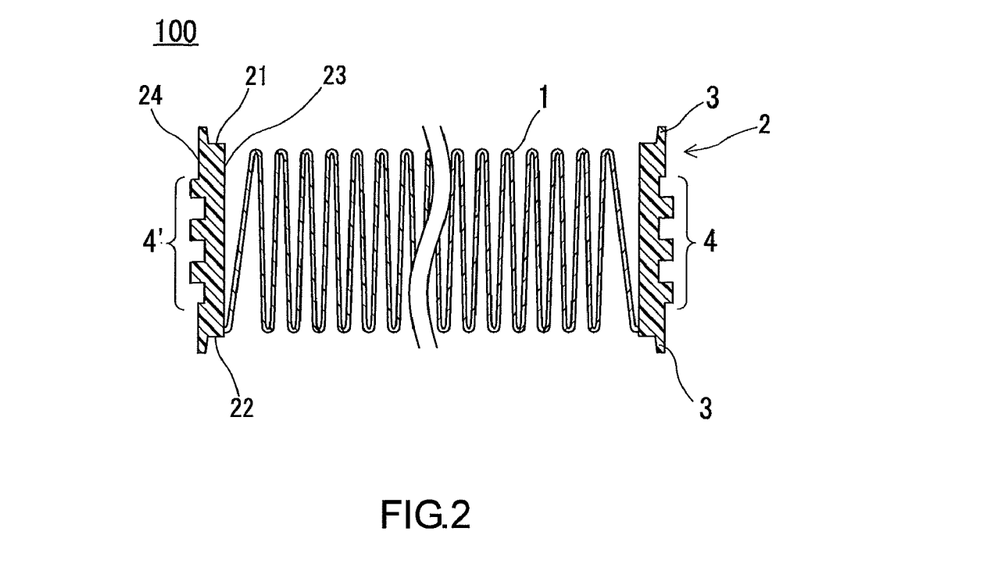
FIG. 2 is a cross-sectional view of the filter unit of FIG. 1.
Figure 3:
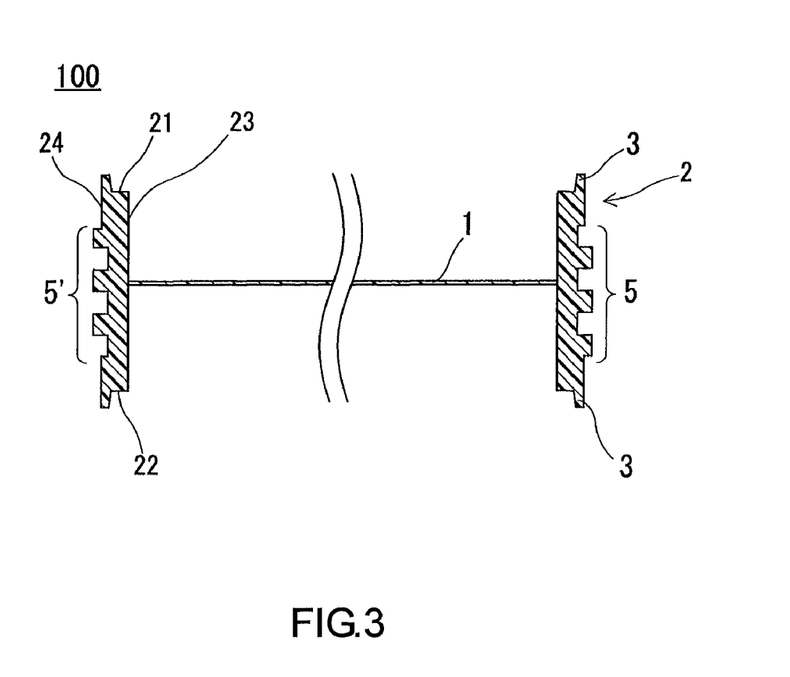
FIG. 3 is a cross-sectional view of the filter unit of FIG. 1 (as viewed from a direction orthogonal to the viewing direction of FIG. 2).

The frame body 2 is provided with engaging portions 4 and 5' formed on its outer peripheral surface 24. The engaging portions 4 and 5' each have convex portions (ridge portions) and concave portions (groove portions) that extend in the circumferential direction of the frame body and are arranged alternately in the height direction thereof. To integrate a plurality of filter units 100 with each other, the engaging portions 4 and 5' of each of the filter units 100 are engaged with the engaging portions of the adjacent filter unit 100. FIG. 2 is a cross-sectional view of the filter unit 100 taken along the direction in which the engaging portion 5' extends. FIG. 3 is a cross-sectional view of the filter unit 100 taken along the direction in which the engaging portion 4 extends.

Protruding portions 3 are formed on the upper surface 21 and the lower surface 22 of the frame body 2. Each of these protruding portions 3 has a wall that extends from the outer peripheral surface of the frame body 2. These protruding portions 3 are formed to surround the frame body 2 on its upper surface 21 and lower surface 22 respectively. The protruding portions 3 serve as welding ribs to integrate the plurality of filter units 100 with each other. To be more precise, the upper surface 21 of the frame body is a surface that is located upstream of the filter medium 1 with respect to the flow of air passing through the filter medium 1 and faces an upstream side of the air flow, and the lower surface 22 is a surface that is located downstream of the filter medium 1 with respect to the flow of the air passing through the filter medium 1 and faces a downstream side of the air flow. These upper and lower surfaces 21 and 22 are located on the opposite sides across the filter medium 1.

The frame body 2 also is provided with an engaging portion 4' formed on the side of its outer peripheral surface 24 opposite to the side on which the engaging portion 4 is formed, across the filter medium 1. The engaging portion 4' is formed in the shape in which convex portions and concave portions are arranged inversely to those of the engaging portion 4, and therefore can be engaged with the engaging portion 4. The engaging portion 5 also is formed in the shape in which convex portions and concave portions are arranged inversely to those of the engaging portion 5', and therefore can be engaged with the engaging portion 5'. As just described, the frame body 2 has a pair of engaging portions 4 and 4' and a pair of engaging portion 5 and 5' respectively on the opposite sides of the outer peripheral surface 24 of the frame body 2 across the filter medium 1 in plan view.

Figure 4:
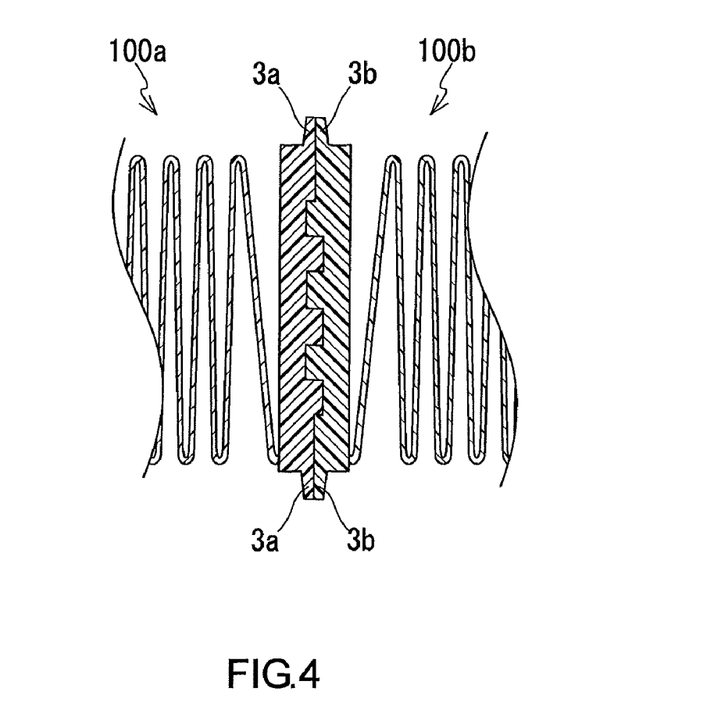
FIG. 4 is a cross-sectional view showing an example of a state in which engaging portions on outer peripheral surfaces of two filter units are engaged with each other.

Hereinafter, how to combine the filter units 100 into a single panel is described. First, a plurality of filter units 100a and 100b are prepared. The engaging portions 4 and 4'; 5 and 5' of the adjacent filter units are engaged with each other with reference to desired shape and size of the panel. The plurality of filter units 100a and 100b are locked and fixed to each other in the height direction of the frame bodies (see FIG. 4). The protruding portions 3a and 3b each have a wall that extends from the outer peripheral surface 24 and are in contact with each other on their walls.

Figure 5:
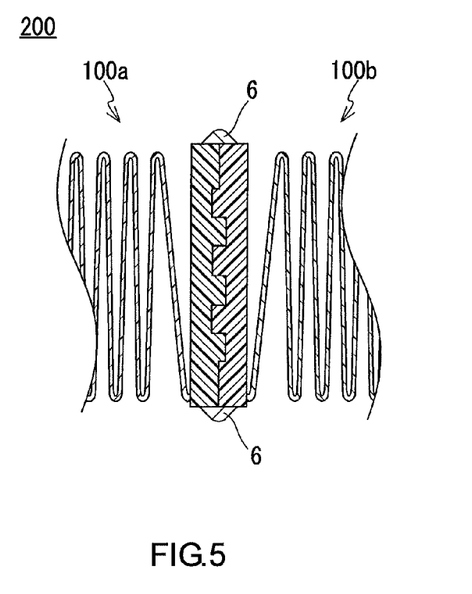
FIG. 5 is a cross-sectional view showing an example of a state in which two filter units are welded to each other.

Next, welding is performed using the protruding portions 3a and 3b of the adjacent frame bodies as welding ribs. The protruding portions 3a and 3b are melted and deformed to straddle the boundaries between the upper surfaces and the lower surfaces of the adjacent frame bodies 2, and then hardened in this state to serve as bonding resins 6 (see FIG. 5). The filter units 100a and 100b also are fixed to each other with the bonding resins 6 in the circumferential direction of the frame bodies. The type of welding is not particularly limited. Ultrasonic welding, heat welding, or laser welding may be used.

Figure 6:
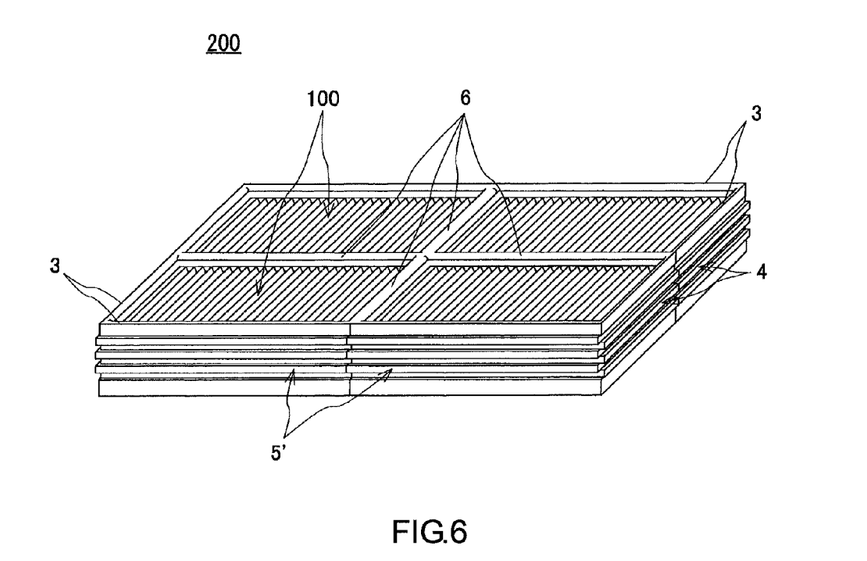
FIG. 6 is a perspective view showing a state (a panel) in which four filter units are joined together.

Thus, as shown in FIG. 6, a filter unit panel 200, in which a plurality of (four in the example of FIG. 6) filter units 100 are integrated into a single unit with the outer peripheral surfaces of the frame bodies being in contact with each other, is fabricated.

The shape of the engaging portions formed on the outer peripheral surface of the filter unit 100 is not limited to the shape having convex portions and concave portions. The engaging portion may have only one convex portion or concave portion. The engaging portions 4, 4', 5 and 5' serve not only to fix the filter units firmly to each other but also to increase the stiffness of the filter unit panel 200. Preferably, in the filter unit panel, the engaging portions having a convex portion and/or a concave portion are formed on the outer peripheral surface of the frame bodies of the filter units and these filter units are integrated into a single unit with the engaging portions of the adjacent frame bodies being engaged with each other.

The protruding portions 3 serving as welding ribs are formed on the upper and lower surfaces of the filter unit 100, but they may be formed only on the upper or lower surface. Welding may be performed without using the protruding portion 3. In this case, a separately-prepared resin member may be used. In either case, it is preferable that the adjacent frame bodies of the filter units be welded with a resin that straddles the boundaries between the upper surfaces and/or the lower surfaces of these frame bodies.

Figure 7:
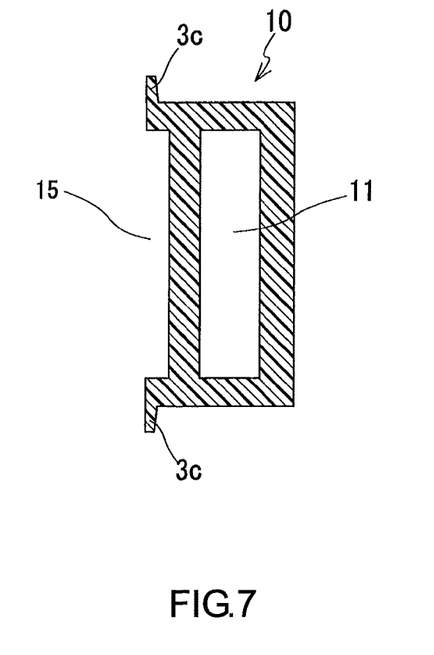
FIG. 7 is a view showing an example of a transverse section of an outer frame.
Figure 8:
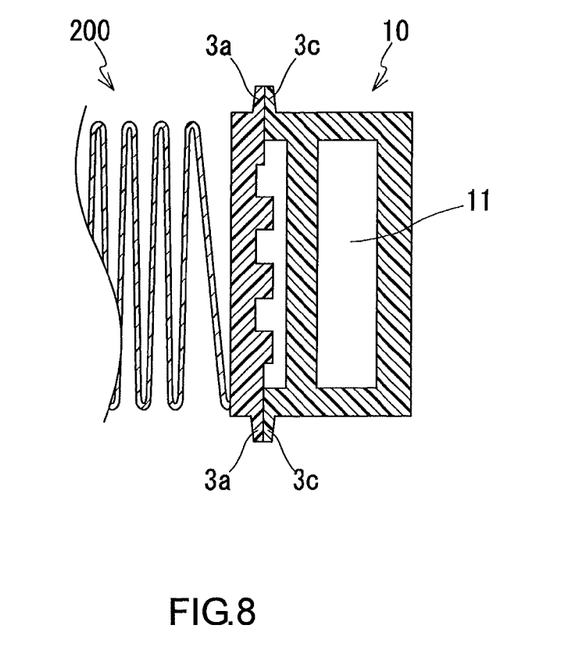
FIG. 8 is a cross-sectional view showing a state in which the outer frame of FIG. 7 is brought into contact with the filter unit.

The filter unit panel 200 further is provided with an outer frame. The outer frame protects the filter units, increases the strength of the entire panel, and facilitates installing the filter units. The outer frame is formed by integrating four bar members into a single unit. FIG. 7 shows a transverse section of an example of the outer frame. As shown in FIG. 8, the outer frame 10 is integrated with the filter unit panel 200. A hollow portion 11 that contributes to reduction in weight of the panel is seen in the transverse section of the outer frame 10.

A recessed portion 15 is formed on the inner peripheral surface (a surface that is in contact with the filter unit panel 200) of the outer frame 10. The recessed portion 15 is formed to prevent the engaging portion 4 of the frame body from coming into contact with the outer frame 10. The outer frame 10 is in contact with the filter unit panel 200 on the upper and lower ends of the recessed portion 15. The recessed portion 15 is formed to accommodate the engaging portion. The recessed portion 15 of the outer frame 10 may be replaced with engaging portions to be engaged with the engaging portions of the filter unit. In this case, the stiffness of the panel is increased further. This case, however, requires the preparation of engaging portions corresponding to the engaging portions formed on the outermost surface of the unit panel to which the outer frame should be fixed. Two or more different types of bar members might be required for the outer frame in this case. On the other hand, the recessed portion 15 eliminates the above-mentioned requirement that would complicate the manufacturing process slightly.

Protruding portions 3c are formed on the upper and lower surfaces of the outer frame 10. Each of these protruding portions 3c has a wall that extends from the inner peripheral surface of the outer frame. The protruding portions 3c are formed so as to come into contact with the protruding portions 3a of the filter unit with the outer frame 10 being in contact with the filter unit panel 200 (see FIG. 8).

The outer frame 10 and the filter unit panel 200 are integrated with each other by welding the protruding portions 3a and 3c as welding ribs. The protruding portions 3a and 3c are melted and deformed to straddle the boundaries between the upper surfaces and the lower surfaces of the frame body 2 and the outer frame 10, and then hardened in this state to serve as bonding resins 7 (see FIG. 9). It is preferable that the outer frame 10 and the frame body adjacent thereto (frame body located at the outermost position of the filter unit panel) be welded with a resin that straddles the boundaries between the upper surfaces and/or the lower surfaces of these outer frame and frame body.

The adjacent bar members of the outer frame 10 also are integrated with each other by welding the protruding portions 3c serving as welding ribs. The protruding portions 3c are melted and deformed by this welding to straddle the boundaries between the upper surfaces and the lower surfaces of the adjacent bar members of the outer frame 10, and then hardened in this state to serve as bonding resins 7' (see FIG. 10). Unlike the welding between the frame bodies or between the outer frame and the frame body, the welding between the bar members of the outer frame 10 is performed using only the protruding portions 3c as welding ribs. If the protruding portions 3c are not enough to achieve the welding, a separately-prepared resin may be placed so that the resin and the protruding portions 3c serve as welding ribs.

Figure 10:
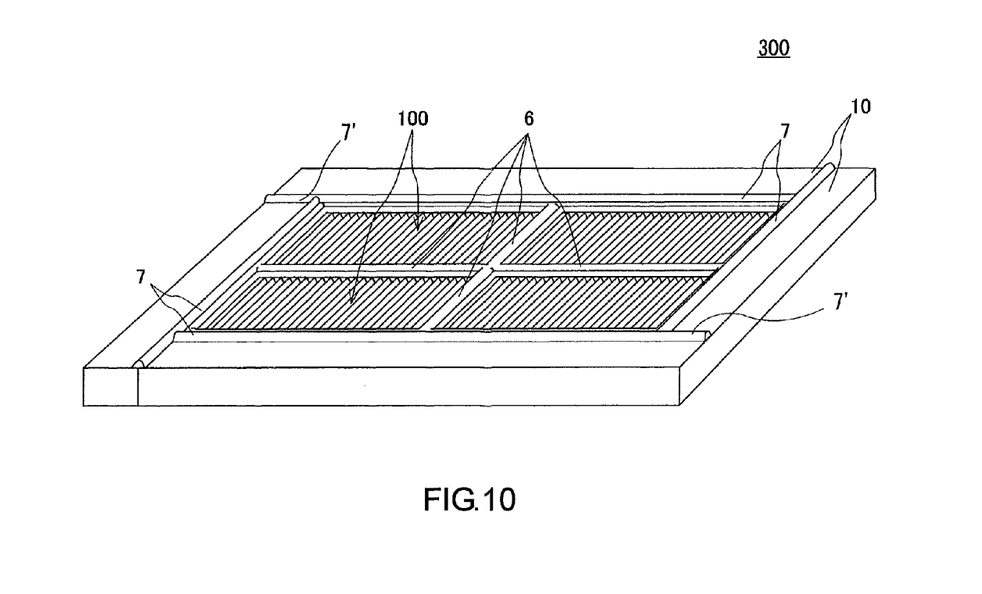
FIG. 10 is a perspective view showing an example of a filter unit panel equipped with an outer frame.

Thus, the bar members of the outer frame 10 are welded to each other, and a filter unit panel 300 equipped with the outer frame is fabricated, as shown in FIG. 10. The outer frame 10 is formed of a plurality of bar members that are integrated into a single unit by welding as described above. Resin members formed by extrusion molding are used suitably for the bar members. The resin members formed by extrusion molding are less subject to defects such as warpage and shrinkage than the resin members formed by injection molding. Preferably, the thickness (height) of the outer frame and the frame body that define the thickness of the filter unit panel is 200 mm or less from the viewpoint of space saving. Particularly preferably, it is less than 50 mm.

Figure 9:
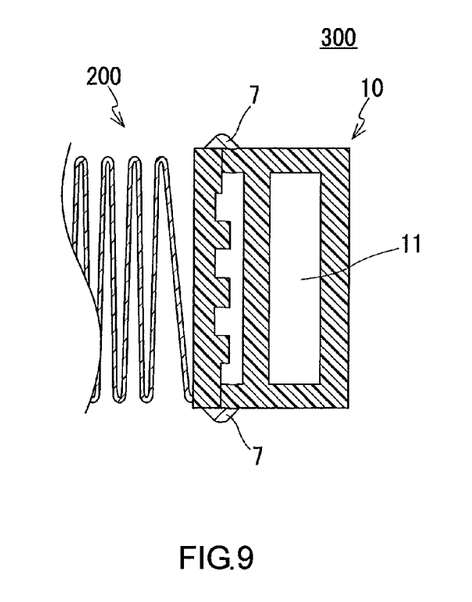
FIG. 9 is a cross-sectional view showing a state in which the outer frame of FIG. 7 and the filter unit are welded to each other.
Figure 11:
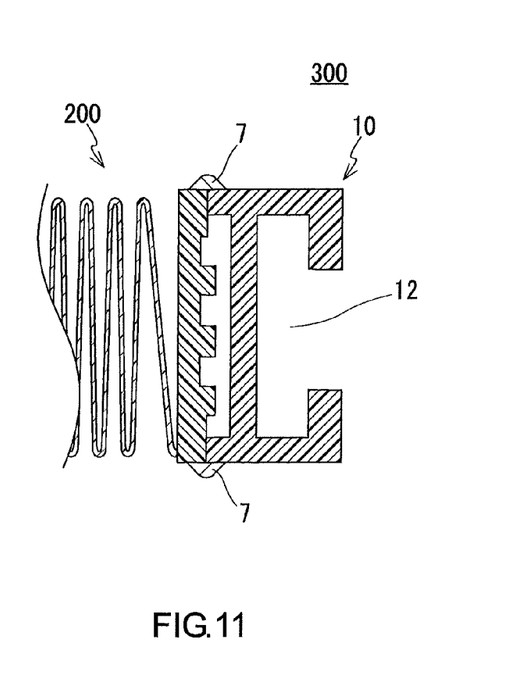
FIG. 11 is a view showing another example of a transverse section of an outer frame.

The shape of the outer frame 10 is not limited to that shown in FIG. 9. FIG. 11 shows a cross-sectional view of a panel 300 in which an outer frame 10 formed of bar members each having a recessed portion 12 on its outer surface is used. Like the hollow portion 11, the recessed portion 12 of the bar member having partly a C-shaped cross section contributes to reduction in weight and facilitates installing the panel 300. Preferably, the bar members that constitute the outer frame 10 are each a resin member formed by extrusion molding, particularly a resin member that is formed by extrusion molding to have a hollow portion and/or a recessed portion in its transverse section. The recessed portion may include a portion 15 that is recessed from the inner surface of the bar member and/or a portion 12 that is recessed from the outer surface thereof.

Examples of the resin that constitutes the frame body 2 and the outer frame 10 include polyolefin resins, polyamide resins (including aromatic polyamide resin), polyurethane resins, polyester resins, polystyrene resins (such as ABS resin), and polycarbonate resins. Two or more of these resins may be used in combination, or different types of resins may be used for the frame body and the outer frame. A filler such as glass fiber or carbon fiber, a pigment, an antibacterial agent, or the like may be added to the resin.

As the filter medium 1, a meltblown nonwoven fabric, an electret filter, or the like may be used. Examples of the preferable filter medium 1 includes a laminate of a porous polytetrafluoroethylene (PTFE) membrane and an air-permeable fabric layer. The air-permeable fabric layer is composed, for example, of a polymeric fiber material. Glass fiber also is a well-known material for the filter medium 1. However, when a glass fiber layer is used as a filter medium, the incineration of such a filter medium is difficult.

Hereinafter, the present invention is described further in detail with reference to Examples.

Example 1

A laminate composed of a porous PTFE membrane and air-permeable fabric layers ("NTF9317-H01" manufactured by Nitto Denko Corporation) was pleated so that 93 pleats having a height of 22 mm were formed therein. This filter medium was set in a mold of an injection molding machine, and a polycarbonate resin ("IUPILON" manufactured by Mitsubishi Engineering-Plastics Corporation) was injection-molded into a frame body. Thus, a filter unit having outer dimensions of 195 mm×295 mm with a height (thickness) of 27 mm was obtained. The shape of this filter unit was the same as that in FIG. 1. The thickness (distance between the inner peripheral surface and the outer peripheral surface) of the frame body was 5 mm. Subsequently, the engaging portions formed on the outer peripheral surfaces of the six filter units were engaged with and fixed to each other. Then, the six filter units were integrated into a single unit by heat-welding the frame bodies of the filter units using the protruding portions formed on the upper and lower surfaces of the frame bodies as welding ribs. The shape of the filter unit panel thus obtained was the same as that in FIG. 6 except that not 2×2 but 2×3 filter units were arranged in the panel.

Figure 12:
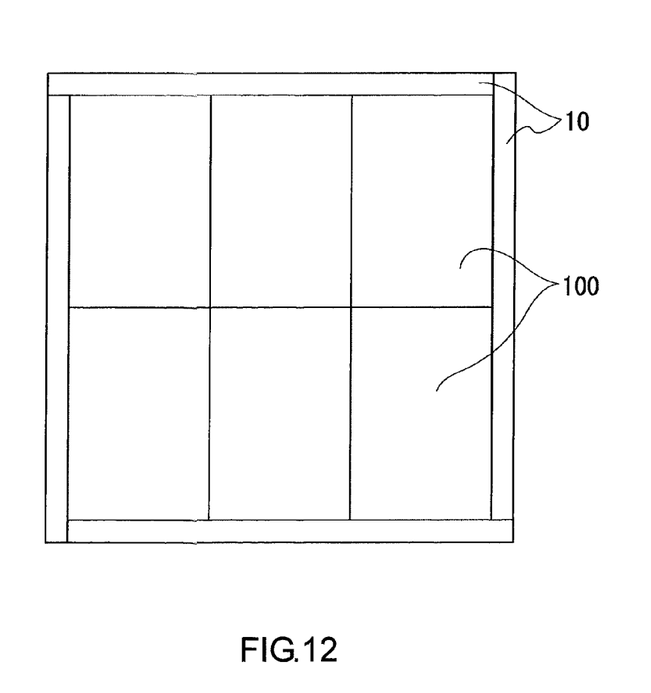
FIG. 12 is a plan view showing an example of a filter unit panel equipped with an outer frame.

Subsequently, four bar members made of polycarbonate resin (above-mentioned "IUPILON"), which had been prepared previously by extrusion molding, were disposed around the filter unit panel. Then, the frame bodies and the bar members were integrated with each other by heat welding using the protruding portions formed on the upper and lower surfaces of the frame bodies and the bar members as welding ribs. The bar members themselves were heat-welded together using the protruding portions formed on the bar members as welding ribs. The outer dimensions of a filter unit panel (air filter) equipped with the outer frame thus obtained were 610 mm×610 mm with a thickness of 27 mm. This filter unit panel was composed of a material that could be disposed of by incineration because it did not contain a metal member or the like. FIG. 12 shows a plan view of this panel. As shown in FIGS. 7 to 9, the bar member used in Example 1 had a hollow portion in its transverse section.

Example 2

An air filter was obtained in the same manner as in Example 1 except that each of the bar members that constituted the outer frame had a portion that was recessed from the outer surface in its transverse section.

Comparative Example 1

Figure 13:
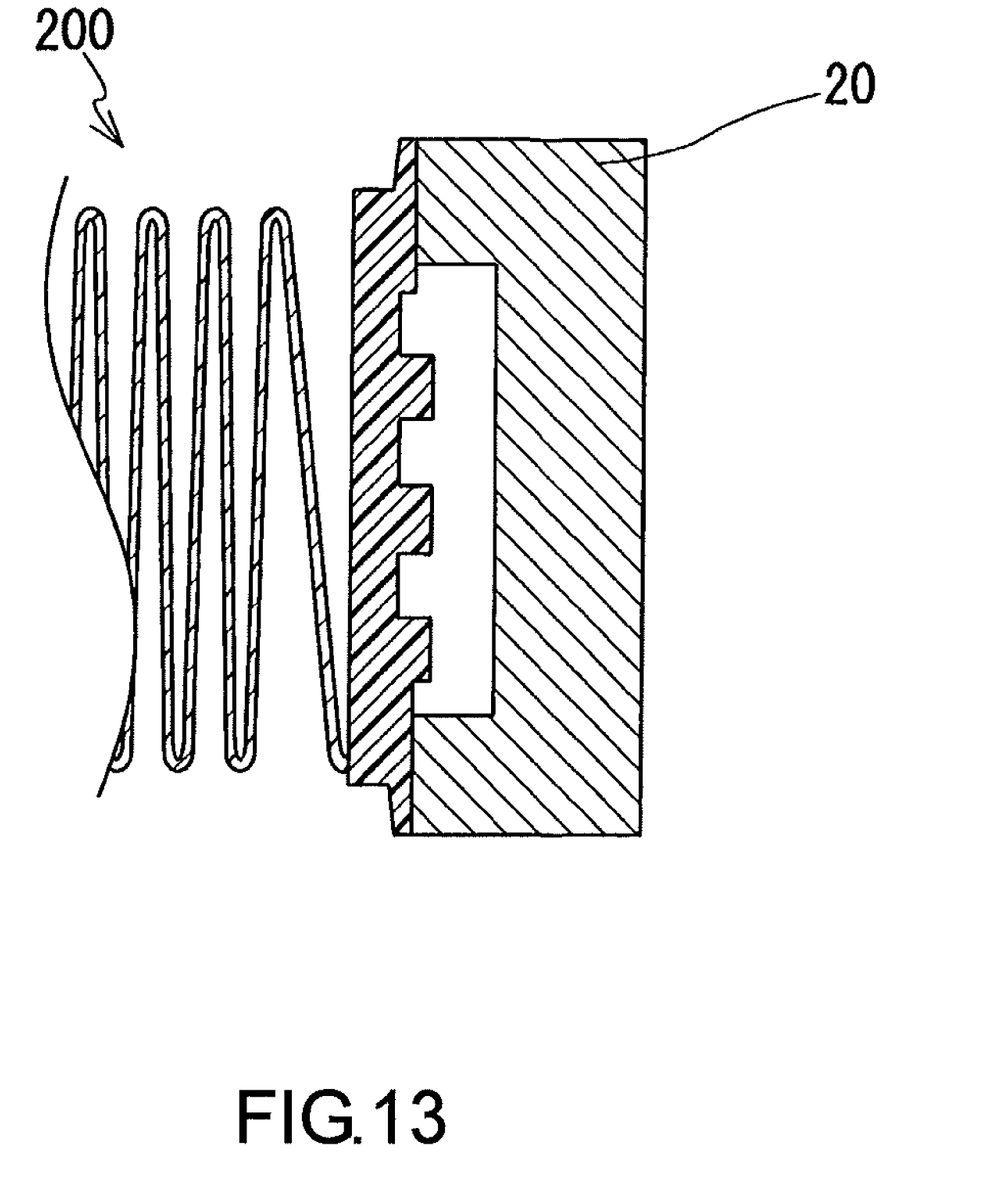
FIG. 13 is a cross-sectional view of an outer frame made of aluminum or wood used for comparison.

An air filter was obtained in the same manner as in Example 1 except that the bar members that constituted the outer frame were made of aluminum members and these aluminum members and the filter unit panel were integrated with each other using a urethane adhesive. FIG. 13 shows a cross-sectional view of this panel. The transverse section of the aluminum member 20 was in a one-side-opened rectangular shape having a recessed portion on its inner surface.

Comparative Example 2

An air filter was obtained in the same manner as in Example 1 except that the bar members that constituted the outer frame were made of wood members and these wood members and the filter unit panel were integrated with each other using a urethane adhesive. The transverse section of this panel also was in the same shape as that shown in FIG. 13.

The amount of torsion of each of the air filters obtained in the above Examples and Comparative Examples and the amount of organic gas generated therefrom were measured.

[Measurement of Amount of Torsion]

The amount of torsion was measured in the following manner. While the outer surface of the lower bar member of the outer frame of the air filter was fixed, a bolt was fastened to the outer surface of the opposite bar member (upper bar member) of the outer frame, and a torque was applied to this bolt with a torque wrench. A displacement (mm) of the end portion of the outer frame (upper bar member) was measured under a torque of 5 kg·cm. The obtained displacement was determined as the amount of torsion.

[Measurement of Amount of Organic Gas]

Figure 14:
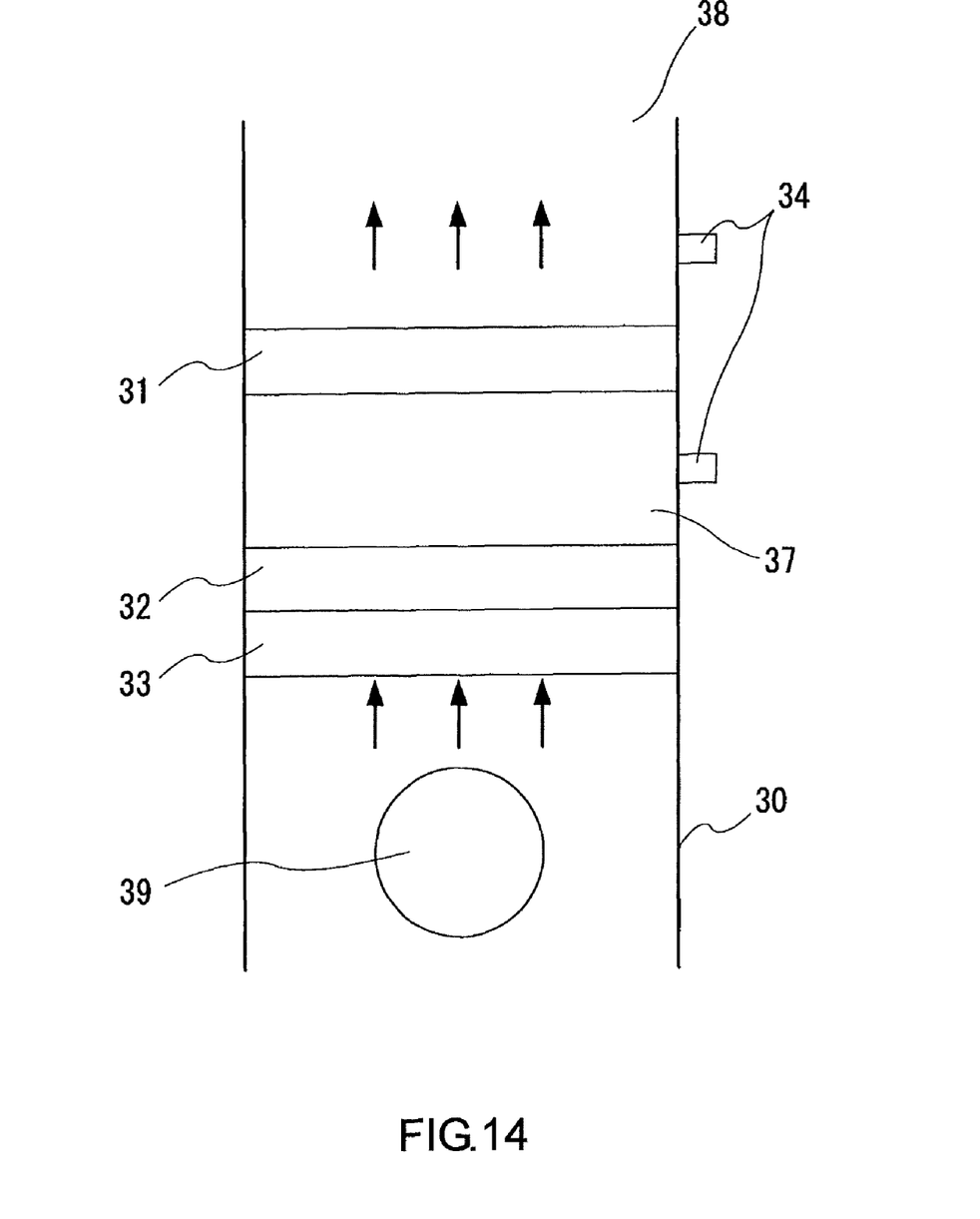
FIG. 14 is a diagram showing a configuration of an apparatus for measuring an organic gas generated from an air filter.

FIG. 14 shows the configuration of a measuring apparatus. In a chamber 30, a fan 39 was placed on the upstream side, and following the fan 39, a chemical filter 33, a ULPA filter 32, and a target air filter 31 for the measurement were installed in this order. TENAX tubes 34 were mounted in a space 37 located upstream of the test filter 31 and a space 38 located downstream thereof respectively. Air was blown from the fan 39 at a rate of 10 m$^3$/min for 1 hour, and then the amount of organic gas components collected in the TENAX tubes was analyzed. Since no organic gas was detected in the TENAX tube located on the upstream side, the difference from the organic gas detected on the downstream side was attributed to the air filter. The analysis of organic gas components was carried out using a gas chromatograph-mass spectrometer (GAS-MASS).

Table 1 shows the results of the above measurements and the weights of the air filters respectively.

TABLE 1

|  | Amount of torsion (mm) | Amount of organic gas (µg/m$^3$) | Weight of filter (kg) |
| --- | --- | --- | --- |
| Example 1 | 12 | 0.1 | 1.9 |
| Example 2 | 40 | 0.1 | 1.7 |
| Com. Example 1 | 60 | 106 | 2.1 |
| Com. Example 2 | 25 | 80 | 2.3 |

In Examples 1 and 2, lightweight air filters in which the generation of an organic gas is suppressed were obtained. Since these air filters consisted of a resin material, they could be disposed of by incineration.

The filter unit panel of the present invention is suitable for air filters used in air inlets of, for example, clean rooms, air conditioning equipments, gas turbines, and steam turbines.

The invention claimed is:

1. A filter unit panel comprising:
a plurality of filter units; and
an outer frame that surrounds the plurality of filter units,
wherein each of the plurality of filter units includes a filter medium and a frame body that supports the filter medium,
both of the outer frame and the frame bodies are resin members,
the plurality of filter units are integrated into a single unit by welding the adjacent frame bodies,
the outer frame and the frame bodies adjacent to the outer frame are integrated with each other by welding, and
the outer frame and each of the frame bodies adjacent to the outer frame are welded to each other with a resin that straddles a boundary between upper surfaces and/or lower surfaces of the outer frame and the frame body, the upper surfaces of the outer frame and the frame bodies being located upstream of the filter medium with respect to a flow of air passing through the filter medium and facing an upstream side of the air flow, and the lower surfaces of the outer frame and the frame bodies being located downstream of the filter medium with respect to the flow of the air passing through the filter medium and facing a downstream side of the air flow.

2. The filter unit panel according to claim 1, wherein the outer frame is formed of a plurality of bar members that are integrated into a single unit by welding.

3. The filter unit panel according to claim 2, wherein each of the plurality of bar members is a resin member that is formed by extrusion molding to have a hollow portion and/or a recessed portion in its transverse section.

4. The filter unit panel according to claim 3, wherein the recessed portion is a portion that is recessed from an outer peripheral surface of the outer frame and/or a portion that is recessed from an inner peripheral surface of the outer frame.

5. The filter unit panel according to claim 1, wherein
an engaging portion having a convex portion and/or a concave portion is formed on an outer peripheral surface of each of the frame bodies, and
the plurality of filter units are integrated into a single unit with the engaging portions of the adjacent frame bodies being engaged with each other.

6. The filter unit panel according to claim 1, wherein the frame body is a resin member that is formed by injection molding to fix a peripheral portion of the filter medium to the frame body.

7. The filter unit panel according to claim 1, wherein the filter medium is a laminate including a porous polytetrafluoroethylene membrane and an air-permeable fabric layer.

8. The filter unit panel according to claim 1, wherein the filter unit panel is composed of a resin material.

9. A filter unit panel comprising:
a plurality of filter units; and
an outer frame that surrounds the plurality of filter units,
wherein each of the plurality of filter units includes a filter medium and a frame body that supports the filter medium,
both of the outer frame and the frame bodies are resin members,
the plurality of filter units are integrated into a single unit by welding the adjacent frame bodies,
the outer frame and the frame bodies adjacent to the outer frame are integrated with each other by welding, and
the adjacent frame bodies of the plurality of filter units are welded with a resin that straddles a boundary between upper surfaces and/or lower surfaces of the frame bodies, the upper surfaces of the outer frame and the frame bodies being located upstream of the filter medium with respect to a flow of air passing through the filter medium and facing an upstream side of the air flow, and the lower surfaces of the outer frame and the frame bodies being located downstream of the filter medium with respect to the flow of the air passing through the filter medium and facing a downstream side of the air flow.

10. The filter unit panel according to claim 9, wherein the outer frame is formed of a plurality of bar members that are integrated into a single unit by welding.

11. The filter unit panel according to claim 10, wherein each of the plurality of bar members is a resin member that is formed by extrusion molding to have a hollow portion and/or a recessed portion in its transverse section.

12. The filter unit panel according to claim 11, wherein the recessed portion is a portion that is recessed from an outer peripheral surface of the outer frame and/or a portion that is recessed from an inner peripheral surface of the outer frame.

13. The filter unit panel according to claim 9, wherein
an engaging portion having a convex portion and/or a concave portion is formed on an outer peripheral surface of each of the frame bodies, and
the plurality of filter units are integrated into a single unit with the engaging portions of the adjacent frame bodies being engaged with each other.

14. The filter unit panel according to claim 9, wherein the frame body is a resin member that is formed by injection molding to fix a peripheral portion of the filter medium to the frame body.

15. The filter unit panel according to claim 9, wherein the filter medium is a laminate including a porous polytetrafluoroethylene membrane and an air-permeable fabric layer.

16. The filter unit panel according to claim 9, wherein the filter unit panel is composed of a resin material.

* * * * *